US012770392B2

(12) United States Patent
Dey et al.

(10) Patent No.: US 12,770,392 B2
(45) Date of Patent: Oct. 20, 2026

(54) LOCATION MONITORING VIA IMAGE COMPARISON

(71) Applicant: Accenture Global Solutions Limited, Dublin (IE)

(72) Inventors: Kuntal Dey, Birbhum (IN); Venkatesh Subramanian, Bangalore (IN); Rambhau Eknath Rote, Bangalore (IN); Senthil Kumaresan, Bangalore (IN); Satyasai Srinivas Abbabathula, Bangalore (IN); Nataraj Kuntagod, Bangalore (IN); Vikrant Kaulgud, Pune (IN); Sanjay Podder, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 728 days.

(21) Appl. No.: 18/338,528

(22) Filed: Jun. 21, 2023

(65) Prior Publication Data

US 2024/0378884 A1 Nov. 14, 2024

(30) Foreign Application Priority Data

May 9, 2023 (IN) ............................ 202311032636

(51) Int. Cl.
*G06V 20/13* (2022.01)
*G06F 18/00* (2023.01)
*G06V 10/25* (2022.01)

(52) U.S. Cl.
CPC .............. *G06V 20/13* (2022.01); *G06F 18/00* (2023.01); *G06V 10/25* (2022.01)

(58) Field of Classification Search
CPC ......... G06V 20/13; G06V 10/25; G06F 18/00
See application file for complete search history.

(56) References Cited

U.S. PATENT DOCUMENTS

| | | | | |
|---|---|---|---|---|
| 6,636,721 | B2 | 10/2003 | Threadgill et al. | |
| 2009/0148152 | A1* | 6/2009 | Kurane .................. | G03B 29/00 396/429 |
| 2011/0298923 | A1* | 12/2011 | Mukae ................... | G08G 1/205 348/E7.085 |
| 2016/0034743 | A1* | 2/2016 | Squires .................. | G06Q 30/06 348/144 |
| 2018/0157930 | A1* | 6/2018 | Rutschman ............ | H04N 25/41 |
| 2019/0050625 | A1* | 2/2019 | Reinstein ............. | G06V 10/235 |
| 2021/0036767 | A1* | 2/2021 | Devaraj ................. | H04B 7/195 |
| 2022/0411109 | A1* | 12/2022 | Ohno .................... | G01S 19/423 |

FOREIGN PATENT DOCUMENTS

CN 103336715 A 10/2013

OTHER PUBLICATIONS

K. Jacobsen, "High Resolution Satellite Imaging Systems—Overview", University of Hannover, p. 9.

* cited by examiner

*Primary Examiner* — David Perlman
(74) *Attorney, Agent, or Firm* — Mannava & Kang, P.C

(57) ABSTRACT

A remote location monitoring system identifies a place of interest and a subset of artificial satellites that can capture images of the place of interest within a threshold period. The next available artificial satellite with image sensors that can capture images of the place of interest earliest is selected and the cache heating signal is transmitted to be stored in a cache associated with the next available image sensor. The cache heating signal activates particular image sensors for image capture and enables the transmission of meaningful images that enable monitoring the place of interest.

18 Claims, 11 Drawing Sheets

LOCATION MONITORING VIA IMAGE COMPARISON

PRIORITY

The present application claims priority under 35 U.S.C. 119(a)-(d) to the Indian Provisional Patent Application No. 202311032636, having a filing date of May 9, 2023, the disclosure of which is hereby incorporated by reference in its entirety.

BACKGROUND

Monitoring of locations may involve collecting data regarding the physical characteristics of an area, for example, by measuring its reflected radiation at a distance, typically from an aerial vehicle such as a hot air balloon, an aircraft, or an artificial satellite. Special cameras can remotely collect image data which helps researchers detect certain aspects of the Earth such as agriculture, forestry, oceanography, etc. Data from different sources such as user images, artificial satellite images may be made available for research or commercial purposes either free of charge or on payment of fees depending on the type of data and the particular source providing the image data.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1A:
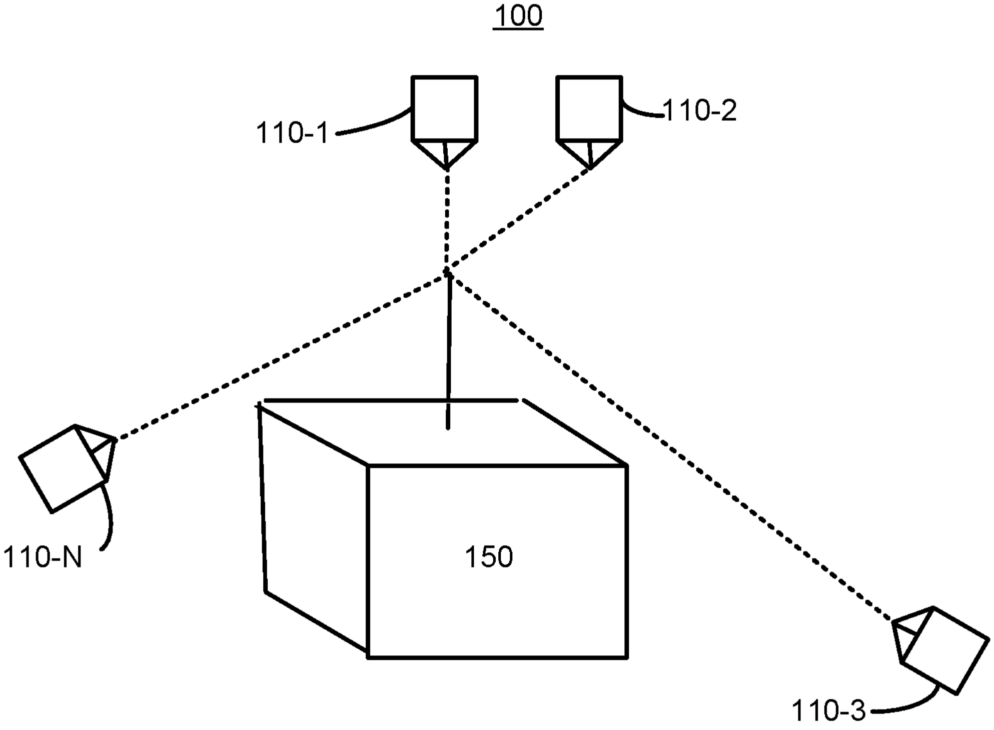
FIG. 1A shows a block diagram of a remote location monitoring system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

According to an example of the present disclosure, a remote location monitoring system is communicatively coupled to artificial satellites orbiting the Earth. The remote location monitoring system automatically identifies a place of interest in satellite images captured by a plurality of the artificial satellites at different locations on the Earth and activates sensors of one or more of the artificial satellites to capture additional meaningful images of the place of interest of particular image quality. For example, the satellite images may include images of places where agriculture is carried out and additional meaningful images of the agricultural activities may be captured. The remote location monitoring system is configured to identify at least a subset of the plurality of artificial satellites that fly over the place of interest within a threshold period. The next available artificial satellite is selected from the subset of satellites based on at least two criteria. The first criterion is that the next available artificial satellite is calculated to reach the place of interest earliest among the subset of satellites. The second criterion is that the next available artificial satellite is capable of capturing meaningful images of the place of interest so that the meaningful images meet predetermined image capture specifications. A cache heating signal specifying the place of interest, the time of image capture, and a cache heat value indicative of the predetermined image capture specifications is transmitted to the next available artificial satellite.

To identify the place of interest, the remote location monitoring system may maintain a time series lat/long database, wherein the images from the plurality of artificial satellites are tagged with corresponding latitude and longitude data and stored in a temporal order. Subsets of the images are generated from those stored in the lat/long database by grouping the images based on respective locations. To identify the place of interest, the images in the subset of images corresponding to earlier time stamps are compared to images in the subset of images with later time stamps. At least one of the subsets of images wherein a change in the images with the earlier time stamps as compared to the images with the later time stamps is greater than a change threshold is identified. In an example, the change threshold is based on absolute pixel-set values triggered as per given conditions or average increasing weight over a series of the corresponding images stored in the time series database. Furthermore, inputs specifying the particular interests, e.g., agriculture or forestry, any expiry dates associated with the interests, and corresponding image capture specifications for the different locations are also received. A location corresponding to one of the subsets of images is identified as the place of interest based on the inputs.

To identify the subset of artificial satellites to capture additional images of the place of interest, a list of one or more of the plurality of artificial satellites that would fly over the place of interest is initially generated. The entries in the list of artificial satellites can include a triplet for each artificial satellite, with each triplet further including a satellite id identifying the artificial satellite, a location id identifying one of the different locations on the Earth over which the artificial satellite traverses within the threshold period and one or more time stamps identifying a period of flight of the artificial satellite over the location. The list of artificial satellites is sorted based on the time stamps and further modified. The modifications to the list of artificial satellites include transforming the triplets into quadruplets by adding to each of the triplets, a corresponding requisite image quality to be achieved by each satellite in the list of artificial satellites. The subset of artificial satellites is generated from the list of artificial satellites by determining if each artificial satellite in the list of artificial satellites is capable of capturing images of the corresponding requisite image quality and deleting those artificial satellites from the list of artificial satellites that are not enabled for the corresponding requisite image quality.

To dynamically heat the cache of the next available artificial satellite at a time of traversal $t_q$ of each artificial satellite of the subset of artificial satellites through a predetermined quantum distance is determined. The time stamp from a corresponding triplet of the artificial satellite is extracted and it is further determined if the time stamp lies between a current time and the time period $t_q$. If the time stamp lies between a current time and the time period $t_q$, the location coordinates of the place of interest, a timestamp at which the place of interest should be imaged, and a requisite quality of image capture are transmitted to the next available artificial satellite. The requisite quality of image capture is mapped to a heat value stored in the cache of the next available artificial satellite and a higher heat value translates to higher image quality. In an example, an interest in the place of interest is valid for a threshold period and the monitoring of the place of interest may be terminated at the end of the threshold period and the subset of images corresponding to the place of interest is deleted at the end of the threshold period.

An artificial satellite that receives at least a place of interest, a timestamp for image capture, and a cache heat value when orbiting the Earth and captures images of the place of interest at the time specified in the time stamp using one or more image sensors capable of meeting the image capture specifications as conveyed in the cache heat value is disclosed. The artificial satellite may include a cache and the cache heat value can be an input to a mapping function that maps the cache heat value into the sensor resolution of one or more onboard imaging sensors. The location tracker and the time tracker of the artificial satellite are activated so that it can be identified when the artificial satellite has reached the place of interest. Further, the time tracker determines when it is time for the image capture based on the time tracker attaining a value specified in the time stamp. At least one imaging sensor is activated based on the mapping and at least one image of the place of interest can be captured by activating the imaging sensor at a time specified in the time stamp.

Artificial satellites today may capture and collect images of the Earth at any point throughout their trajectories and stream the images back to the ground stations where they are further processed. Each artificial satellite may have one or more sensors, and possibly multiple sensors. Currently, the mechanisms to activate the sensors are rather static in that apart from pre-programmed heuristics, there is no way to intelligently choose the sensors aboard the artificial satellite when it is in flight. In particular, a technology gap exists as there is no mechanism for a satellite-based ground monitoring system to specify to the artificial satellites in orbits, the place(s) to watch, the timings associated with such monitoring, or the quality of data (e.g., images) to be collected. As a result, the existing satellite-based remote monitoring systems fail to utilize a group of artificial satellites to inter-orchestrate to improve such observation, especially when done to meet specific standards of observation quality. Enabling selection and dynamic activation of the various sensors aboard the artificial satellites on-the-fly can lead to optimal use of the satellite sensors. The remote location monitoring system disclosed herein is configured to remotely observe and monitor dynamically evolving places based on certain interests (e.g., spots where a certain fruit is growing on agricultural land, etc.), adjusting sensor usage plans for quality and size of images as per a requirement value computed on-the-fly. As a result, the remote location monitoring system disclosed herein provides for a remote-observation computing ecosystem that is energy-saving, frugal, feasible, and fast in terms of data collection and processing. The remote location monitoring system is enabled to collect the required ground truth at the most optimal resolution with the least possible impact on the data and computing bulk.

2. System Architecture

FIG. 1A shows a block diagram of the remote location monitoring system 100 in accordance with the examples disclosed herein. The system 100 includes a plurality of artificial satellites 110-1, 110-2, 110-3, . . . , 110-N, where N is a natural number and n=1, 2, 3 . . . orbiting the Earth in well-defined trajectories and communication with a satellite orchestrator 150. The plurality of artificial satellites 110-1, . . . , 110-N, may be executing various functions such as recording weather conditions, enabling communications on the Earth, etc. While in orbit, the plurality of artificial satellites 110-1, . . . , 110-N, can capture images of different places or locations of the Earth. The plurality of artificial satellites 110-1, . . . , 110-N,s may traverse over different places each day. In an example, it is determined that a good frequency of taking images for each of these locations may be between 5-7 hours, and quality is associated with each image requirement. The plurality of artificial satellites 110-1, . . . , 110-N, can be configured to send data to different ground stations (not shown) which in turn may transmit the data from the plurality of artificial satellites 110-1, . . . , 110-N, to the satellite orchestrator 150. In an example, the satellite orchestrator 150 can be configured to receive the images from the plurality of artificial satellites 110-1, . . . , 110-N, and identify places of interest based on inputs provided regarding such interests. In different examples, the interests may pertain to agriculture, tourism, weather, environmental conditions in the atmosphere and/or on the ground, etc. The interests may last for a predetermined period or may be terminated on-the-fly depending on the events being monitored. For example, two specific artificial satellites can be identified from a first provider, and one artificial satellite each may be identified from two other providers, such that, (a) there is a sufficient time gap of about 5 and 7 hours between two pictures in some instances, and summing up to a 24-hour cycle, and, (b) each artificial satellite will have the capability of capturing the given image at the desired quality.

The satellite orchestrator 150 can include a computing system including a processor and a data store that identifies places of interest from the images transmitted by the plurality of artificial satellites 110-1, . . . , 110-N. From the places of interest, the various inputs may be used to select at least one place of interest to be monitored. A subset of the plurality of artificial satellites 110-1, . . . , 110-N, that can capture meaningful images of the selected place of interest are identified by the satellite orchestrator 150. Amongst the subset of the plurality of artificial satellites 110-1, . . . , 110-N, the satellite orchestrator 150 identifies the next available artificial satellite to be approaching the selected place of interest and sends signals to heat the cache of the next available artificial satellite. In an example, the cache can include software or a hardware memory storage area where the satellite orchestrator 150 can store information regarding the location to be imaged and the quality at which the image(s) are to be captured. For example, if the artificial satellite 110-1 is approaching the selected place of interest, then the satellite orchestrator 150 can transmit the signal to 'heat' the cache of the artificial satellite 110-1. As the artificial satellite 110-1 approaches the place of interest, the appropriate sensor or camera is activated and the image(s) of a desired resolution is captured and may be transmitted back to the satellite orchestrator 150. Thus, even as the artificial satellite 110-1 is orbiting the Earth, specific cameras or sensors on the artificial satellite 110-1 can be dynamically selected and activated by the satellite orchestrator 150 to obtain information regarding the selected place of interest.

Figure 1B:
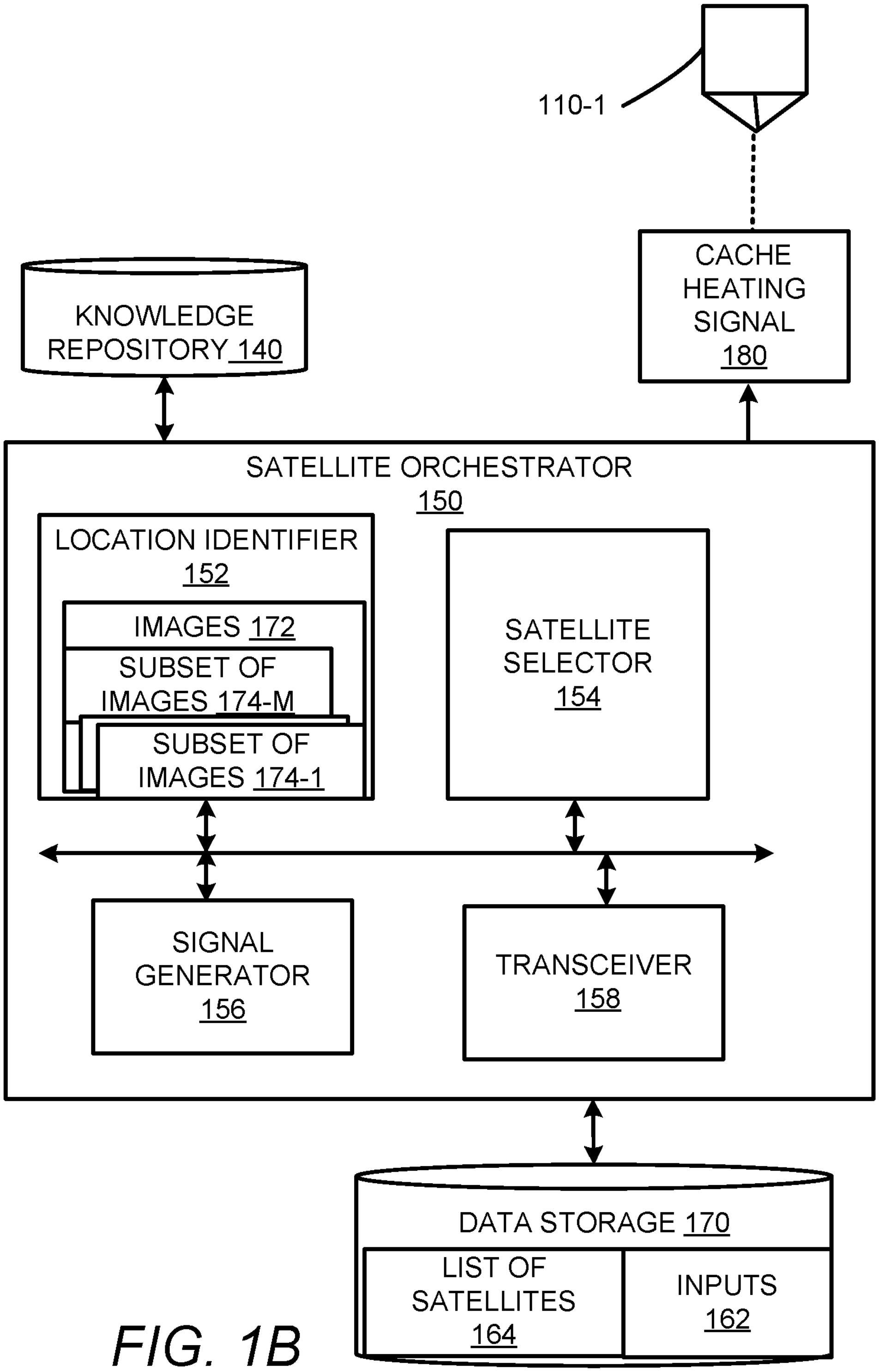
FIG. 1B shows a block diagram of a satellite orchestrator in accordance with the examples disclosed herein.

FIG. 1B shows a block diagram of the satellite orchestrator 150 in accordance with the examples disclosed herein. The satellite orchestrator 150 includes a location identifier 152, a satellite selector 154, a signal generator 156, and a transceiver 158. The satellite orchestrator 150 accesses images 172 captured by the plurality of artificial satellites 110-1, . . . , 110-N, and sent back to the Earth. The images 172 include images of different places or locations on the Earth captured by the plurality of artificial satellites 110-1, . . . , 110-N, during their revolutions around the Earth. In an example, each of the plurality of artificial satellites 110-1, . . . , 110-N, can have at least one or preferably multiple sensors and/or cameras with different attributes to capture different types of images e.g., images of different resolutions. Accordingly, the images 172 from different ones of the plurality of artificial satellites 110-1, . . . , 110-N, may not only show different locations but may also possess different qualities. In an example, the images 172 may be tagged with location data (latitude/longitude) to form different subsets of images so that one image subset e.g., the subset of images 174-1 will correspond to one location as captured by one or more satellites at different times in a given time period. In an example, the images 172 including the different subsets of images 174-1, 174-2, . . . , 174-M, (wherein M is a natural number and M=1, 2, 3, . . . ), can be stored in a time series database. The location identifier 152 can further process the subset of images 174-1 with further inputs 162 specifying locations to be processed. As mentioned above, the inputs 162 specifying locations can be used to identify events associated with different endeavors such as agriculture, tourism, environmental changes, disaster management, etc. In an example, images of a location over a prolonged period of time (e.g., many years) may be used to process slower events such as deforestation/afforestation or images may be used to study sudden events such as harvesting of crops, etc. In an example, the inputs 162 can also specify the period of interest in the place/location and the quality of images to be captured. A subset of the images 172 corresponding to a particular location taken by one or more of the plurality of artificial satellites 110-1, . . . , 110-N, at different times are analyzed by the location identifier 152 to identify the changes or events occurring at the particular location. In an example, the interest may be associated with the location/place for a limited period after which the interest may expire and the images associated with the place will no longer be further analyzed.

The satellite selector 154 can access a knowledge repository 140 to determine the subset of the plurality of artificial satellites 110-1, . . . , 110-N, that will fly over the place of interest. The satellite selector 154 can access the information regarding the plurality of artificial satellites 110-1, . . . , 110-N, from a knowledge repository 140 which may not only store the identification information of the plurality of artificial satellites 110-1, . . . , 110-N, but may also store their attribute information. Using the temporal attributes of the plurality of artificial satellites 110-1, . . . , 110-N, the satellite selector 154 can generate a list of artificial satellites 164 that fly over the place of interest during the threshold period as specified in the inputs 162. In an example, the list of artificial satellites 164 may be made of triplets wherein each triplet includes a satellite id identifying the artificial satellite, a location id identifying a location on the Earth over which the artificial satellite flies over, and a time stamp identifying a period of flight of the artificial satellite over the location. The satellite selector 154 may employ the periods of flight of each of the artificial satellites in the list of artificial satellites 164 to identify the next available artificial satellite that can capture meaningful images of the place of interest.

The information regarding the next available artificial satellite is provided to the signal generator 156 to 'heat the cache' of the next available artificial satellite thereby enabling it to capture the images of the place of interest. In an example, the location information, the period for image capture, and the required resolution are pushed in a cache heating signal 180 to the next available artificial satellite which is selected for image capture. On receiving the cache heating signal 180 from the satellite orchestrator 150, the next available artificial satellite captures the image(s) of the place of interest with the requisite resolution and transmits them back to the satellite orchestrator 150 where they are received by the transceiver 158. In an example, different images with different resolutions may be required based on the inputs 162. Accordingly, multiple cache heating signals can be transmitted to more than one of the plurality of artificial satellites 110-1, . . . , 110-N, to capture images of the place of interest at different times with different resolutions. Therefore, the remote location monitoring system 100 can be configured to employ multiple artificial satellites to monitor the place of interest.

Figure 2:
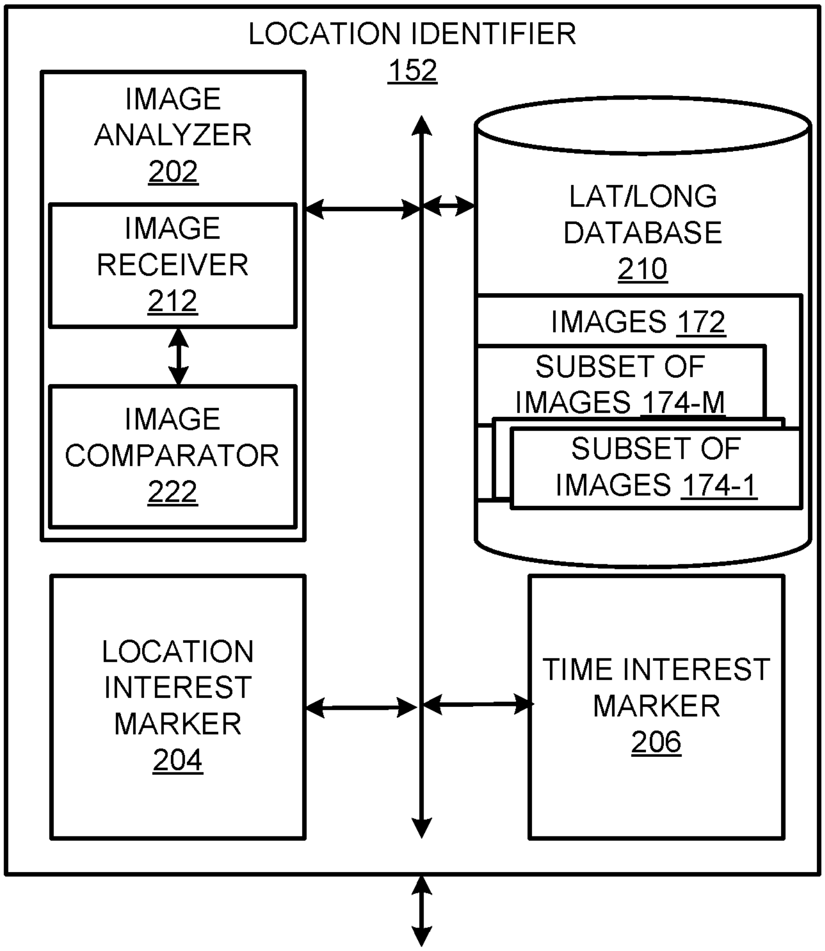
FIG. 2 shows a block diagram of a location identifier in accordance with the examples disclosed herein.

FIG. 2 shows a block diagram of the location identifier 152 in accordance with the examples disclosed herein. The location identifier 152 includes an image analyzer 202, a location interest marker 204, and a time interest marker 206. In an example, the location identifier 152 may also include a lat/long database 210 that stores location coordinates e.g., Global Positioning System (GPS) coordinates of the various places/locations being imaged by the plurality of artificial satellites 110-1, . . . , 110-N. It may be appreciated that the lat/long database 210 doesn't need to be included in the location identifier 152. It may be external to the location identifier 152 within the satellite orchestrator 150 or indeed even remote from the satellite orchestrator 150. The image analyzer 202 includes an image receiver 212 and an image comparator 222. The image receiver 212 accesses the images 172 from the plurality of artificial satellites 110-1, . . . , 110-N, which are provided to the image comparator 222. In an example, the image receiver 212 can access images tagged with location data to populate a time-series database of latitude-longitude (the lat-long database 210) with the latitude-longitude being a primary index that uniquely identifies each entry in the lat-long database 210 which is optimized for time-stamped or time series data. The lat-long database 210 can span over a set of the union of latitudes and longitudes (with reasonable precision) that the plurality of artificial satellites 110-1, . . . , 110-N, cover with at least a certain frequency (higher than a flying frequency threshold).

Therefore, the image receiver 212 may transmit the images grouped by location data and optionally the time of capture to the image comparator 222 so that images from one or more of the plurality of artificial satellites 110-1, . . . , 110-N, taken at prior time points can be compared with those taken at later time points within a threshold period. The image comparator 222 can employ deep learning-based image comparison techniques to determine image similarity. The image comparator 222 can identify subsets of images associated with different places wherein the cumulative change across the different images in each of the subsets 174-1, . . . 174-M, is greater than a change threshold. The change threshold is based on (a) absolute pixel-set values triggered as per given conditions or (b) average increasing weight over a series of the corresponding images stored in the lat/long database 210.

The location interest marker 204 can access the subsets of images 174-1, . . . , 174-M, along with the inputs 162 regarding particular types of interests in specific places which may be time-limited. In an example, the inputs 162 can be provided in particular data formats so that simple text processing techniques can be implemented by the location interest marker 204 to identify the locations of interest, the type of interests, and the timings if any are mentioned. The location data from the inputs 162 can be matched with the location data retrieved from the lat/long database 210 to mark at least one of the subsets of images 174-1, . . . 174-M, e.g., the image subset 174-1, at the place of interest. Any period specified in the inputs 162 for interest in a particular place can be used by the time interest marker 206 to associate an expiry date with the image subset 174-1 so that when the expiry date is reached, the image subset 174-1 is automatically disregarded from processing.

Figure 3:
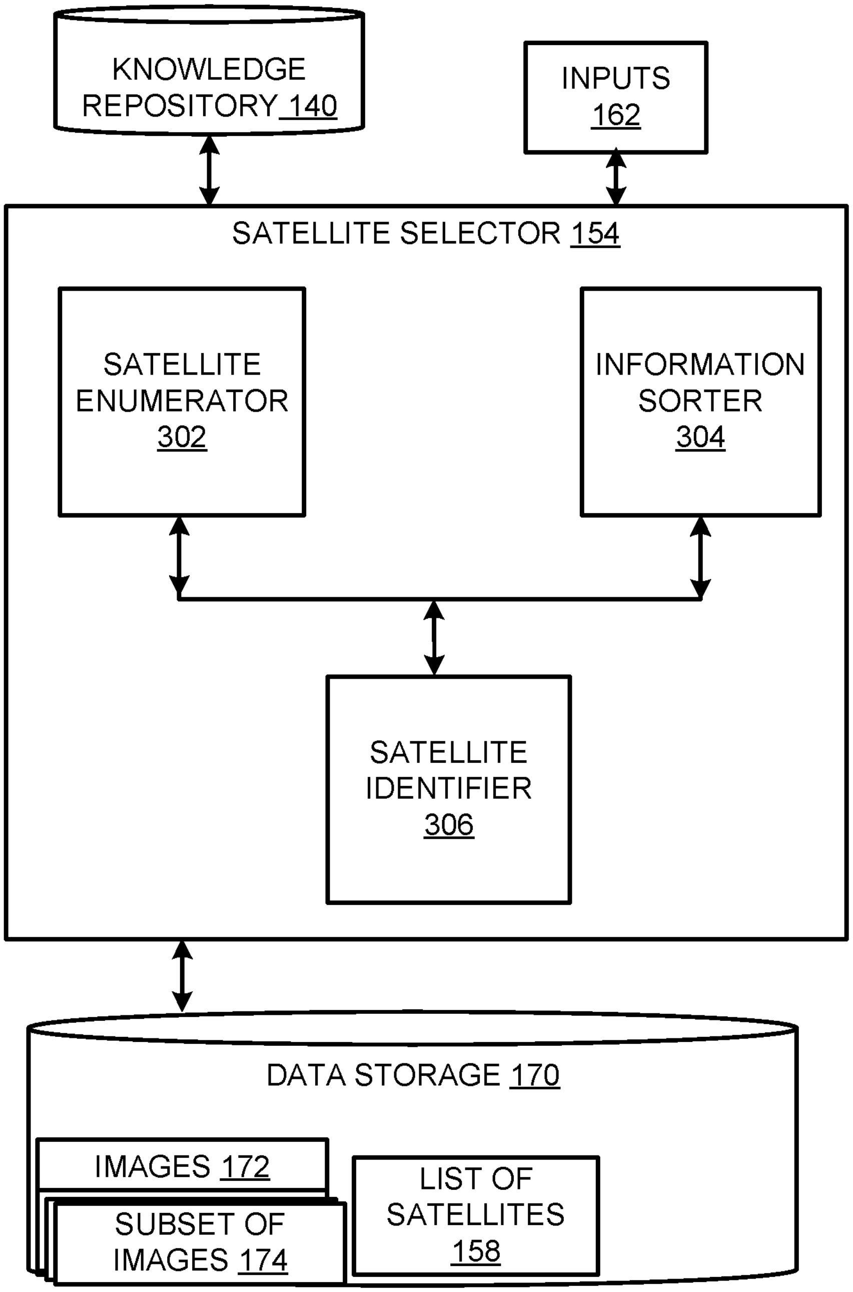
FIG. 3 shows a block diagram of a satellite selector in accordance with the examples disclosed herein.

FIG. 3 shows a block diagram of the satellite selector 154 in accordance with the examples disclosed herein. The satellite selector 154 receives the information regarding the place of interest from the location identifier 152 and identifies the next available artificial satellite that will fly over the place of interest which is capable of capturing the requisite images. The satellite selector 154 includes a satellite enumerator 302, an information sorter 304, and satellite identifier 306. The satellite enumerator 302 generates a list of a subset of the plurality of artificial satellites 110-1, . . . , 110-N, that would fly over the place of interest. In an example, the satellite selector 154 can access the knowledge repository 140 which includes the information regarding the plurality of artificial satellites 110-1, . . . , 110-N, but also the attributes of the various artificial satellites enumerated therein. The satellite enumerator 302 can match the location and temporal attributes from the knowledge repository 140 with the location data and the expiry date set by the location identifier 152 to identify those artificial satellites whose trajectories indicate that they will cover the place of interest sometime from the current date/time and before the expiry date. One or more such artificial satellites can be identified and listed. The list of artificial satellites 164 can be thus generated to include a triplet with a satellite id identifying the particular artificial satellite from the plurality of artificial satellites 110-1, . . . , 110-N, a range of location ids identifying a latitude/longitude range over which the artificial satellite flies over between the current date/time and the expiry date and a time stamp identifying the date when the artificial satellite will move away the place of interest. Based on the time stamps, the list of artificial satellites 164 can be sorted by the information sorter 304. In an example, the list of artificial satellites 164 may be sorted in ascending order of the time stamps so that the next n artificial satellites (wherein n is a natural number and n=1, 2, 3 . . . ) that will begin crossing the place of interest (i.e., with the shortest time lag) is identified by the information sorter 304 and provided to the satellite identifier 306. The sorted list of artificial satellites is processed by the satellite identifier 306 with the corresponding attributes of the artificial satellites enumerated therein. The satellite identifier 306 can match the requirements for image resolution and other image properties with the specifications of the cameras and/or sensors aboard the artificial satellites (obtained from the knowledge repository 140) in the sorted list of artificial satellites. The sorted list of artificial satellites may be processed in the sorted order and one or more artificial satellites with the hardware capability to meet the requirements conveyed in the inputs 162 may be selected and output by the satellite selector 154.

Figure 4:
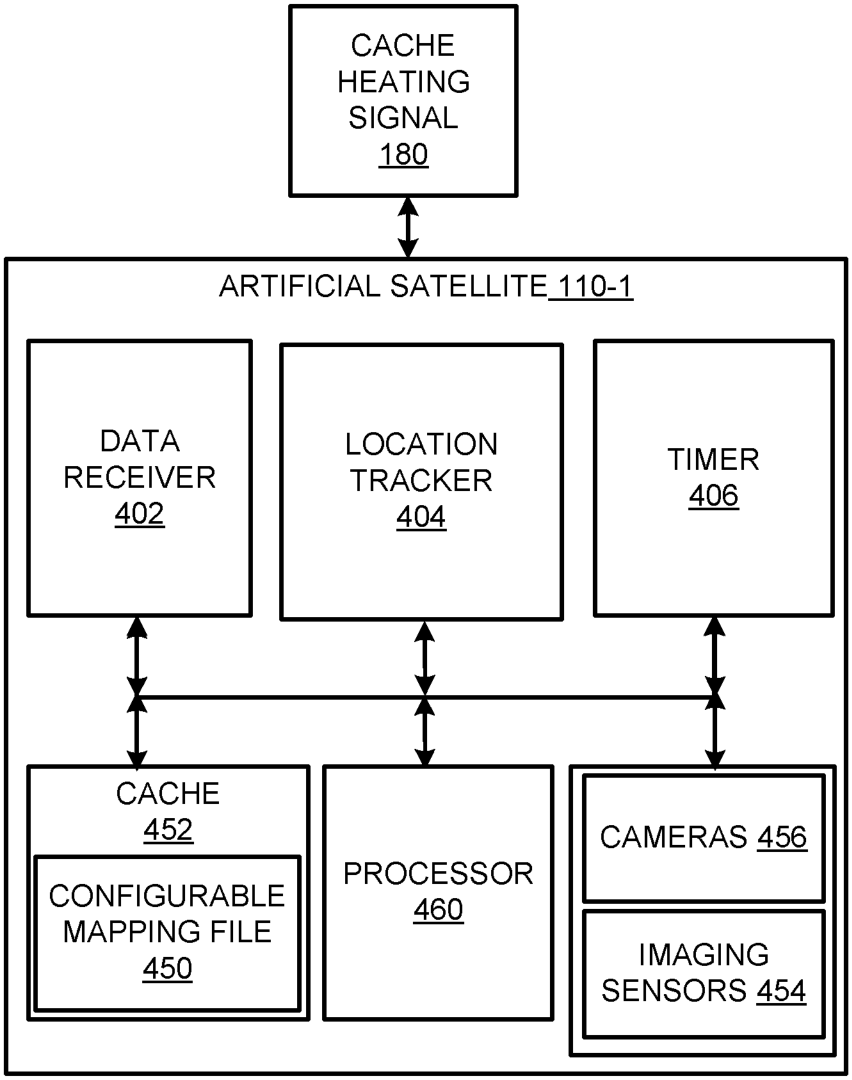
FIG. 4 shows a block diagram of an artificial satellite in accordance with the examples disclosed herein.

FIG. 4 shows a block diagram of an artificial satellite, e.g., the artificial satellite 110-1 in accordance with the examples disclosed herein. It may be appreciated that the block diagram shows some example components required for the implementation of the remote monitoring of places of interest and that the plurality of artificial satellites 110-1, . . . , 110-N, can include other components as necessary. The artificial satellite 110-1 includes a data receiver 402, a location tracker 404, a timer 406, an onboard cache 452, one or more imaging sensors 454, and one or more cameras 456. The various parts including the hardware and software components can be controlled by a processor 460 which may execute instructions to carry out remote location monitoring in accordance with the examples disclosed herein.

When the artificial satellite 110-1 is selected as the next available artificial satellite to obtain images of the place of interest, the data receiver 402 can receive data from the satellite orchestrator 150 regarding the location coordinates of the place of interest, the threshold period during which the images of the place of interest are to be captured, expiry date (if any) and image resolution requirements. For example, the satellite orchestrator 150 may only require a few high-quality images but may require many lower-quality images to detect any gradual changes due to the events on the ground. Accordingly, the information conveyed by the satellite orchestrator 150 regarding the location coordinates, the temporal information, and the image resolution requirements are stored in the cache 452. The cache 452 may include a hardware cache or a software cache. Furthermore, the cache 452 may store a configurable mapping file 450 which maps different cache heat levels to image sensor resolutions of the imaging sensors 454 and the cameras 456 so that based on the requirements, the levels (and hence the image resolutions) may be set dynamically on-the-fly.

The location tracker 404 tracks the trajectory of the artificial satellite 110-1. When a location specified in the cache heating signal 180 is reached, the timer 406 may be verified with the time of image capture specified in the cache heating signal 180, so that the processor 460 triggers the appropriate imaging sensors 454 and/or cameras 456 to capture image(s) of specified resolutions. The images can be captured at different time points before the expiry date. The images thus captured can be transmitted to the satellite orchestrator 150.

3. Flowcharts

Figure 5:
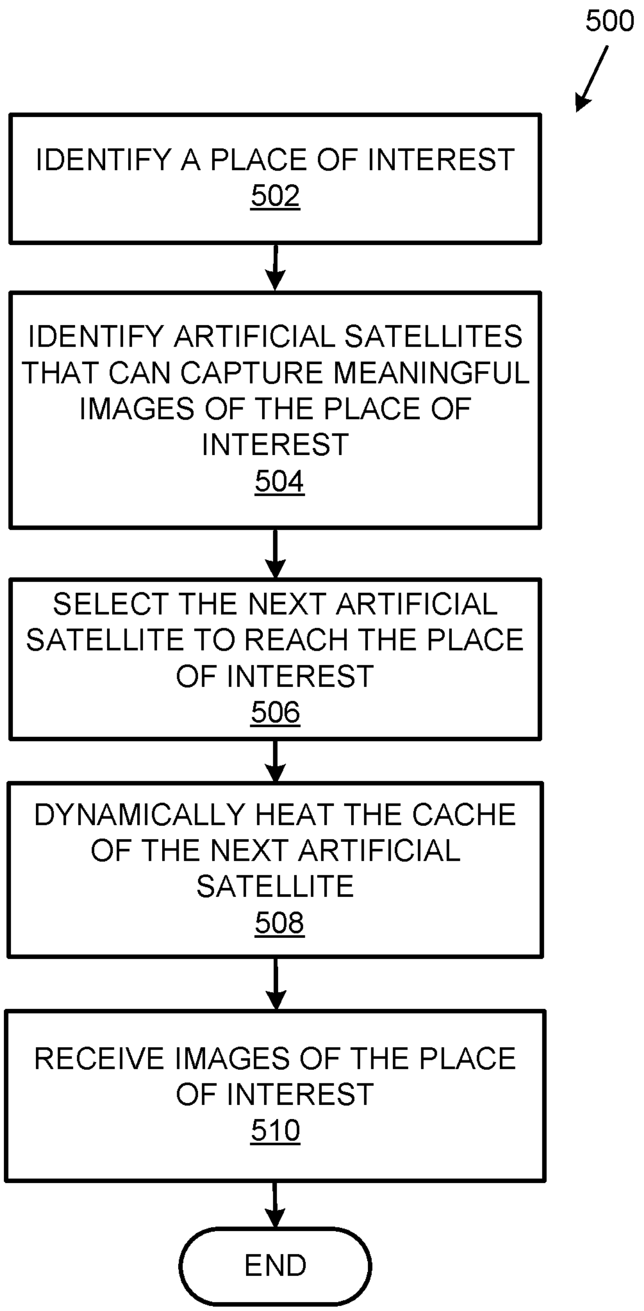
FIG. 5 shows a flowchart that details a method of remotely monitoring a place of interest in accordance with the examples disclosed herein.

FIG. 5 shows a flowchart 500 that details a method of remotely monitoring a place of interest as implemented by the satellite orchestrator 150 in accordance with the examples disclosed herein. The method begins at 502 wherein a place of interest is identified based on images of different places received from the plurality of artificial satellites 110-1, . . . , 110-N, over a predefined time period. For example, the satellite orchestrator 150 can access the image databases of multiple providing companies and retrieves the images that it is allowed to multiple times every day. The interest in a particular place may extend indefinitely or for a threshold period limited by a time point defined by a particular date/time or conclusion of an event. At 504, a subset of artificial satellites that can capture meaningful images of the place of interest within the threshold period are identified from the plurality of artificial satellites 110-1, . . . , 110-N. In an example, meaningful images are those images that are captured in accordance with the location, temporal, and image quality specifications provided in the cache heating signal 180. At 506, a next available artificial satellite to reach the place of interest is selected from the list of artificial satellites 164. The cache of the next available artificial satellite to reach the place of interest is dynamically heated at 508. For example, if the next available artificial satellite to reach the place of interest is the artificial satellite 110-1, then the cache 452 of the artificial satellite 110-1 is dynamically heated by the satellite orchestrator 150 by transmitting the cache heating signal 180. On receiving the cache heating signal 180, the next available artificial satellite can capture additional meaningful images of the place of interest at the designated time with the specified image attributes. The images thus captured are received by the satellite orchestrator 150 at 510. In an example, the threshold time may be limited and if so, monitoring of the place of interest will be terminated and the subset of images corresponding to the place of interest are deleted at the end of the threshold period.

Figure 6:
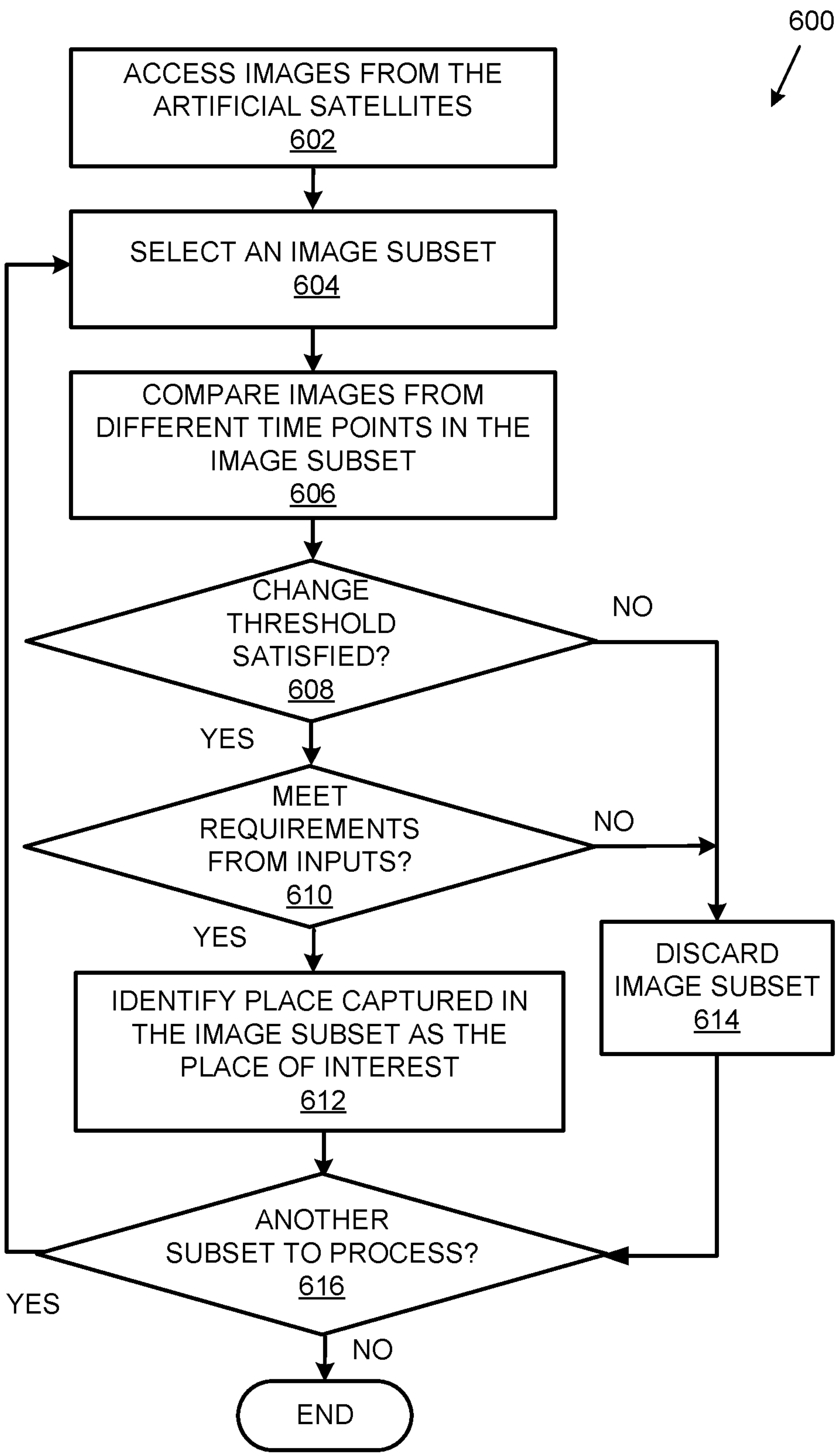
FIG. 6 shows a flowchart of a method of identifying the place of interest in accordance with the examples disclosed herein.

FIG. 6 shows a flowchart 600 of a method of identifying the place of interest in accordance with the examples disclosed herein. The method begins at 602 wherein the images 172 from the plurality of artificial satellites 110-1, . . . , 110-N, are accessed. Each time one of the plurality of artificial satellites 110-1, . . . , 110-N, flies over a given location, a low-resolution image can be clicked and sent back to be tagged with the location and temporal data and stored in the lat-long database 210. The images 172 may be processed to form the subsets of images 174-1, . . . 174-M, grouped by the locations across the globe and captured by different artificial satellites at different time points within the threshold period. A series of such images of a given place/location can be collected within a given time period. At 604, an image subset is selected from the subsets of images 174-1, . . . 174-M. At 606, the images collected at prior time points within a selected image subset can be compared with the images collected at later time points within the threshold period within the selected image subset. At 608, it is determined if the images in the selected subset of images satisfy a change threshold for further processing. The change threshold can be met when at least one of the two conditions is satisfied i.e., (a) either the absolute pixel-set values are triggered based on one of the inputs 162 or (b) the changes in the images captured at later time points are sufficiently higher as compared to the images captured at the earlier time points. For example, if the images pertain to a place where agriculture is carried out, the earlier images may show fields with crops whereas images captured later may show empty fields where the crops have been harvested and thereby the set of images may satisfy the change threshold. If it is determined that the images in the selected subset of images do not satisfy the change threshold, the image subset is discarded at 614 and the method moves to 616 to determine if another subset of images remains to be processed. If more subsets of images are to be processed, the method returns to 604 to select another image subset, else the method terminates on the end block.

If it is determined at 608 that the images in the selected subset of images satisfy the change threshold, it is further determined at 610 if the selected subset of images meets any of the interest requirements specified in the inputs 162. The interests may pertain to specific places, particular events, a particular time, etc. Furthermore, the interests expressed may be time-limited. Based on a determination at 610 that the selected subset of images satisfies the requirements expressed in one or more of the inputs 162, the place associated with the selected subset of images is identified as the place of interest at 612. In an example, the cache heating signal to capture one or more images of higher resolution may be transmitted. If it is determined at 610 that the selected subset of images does not satisfy the requirements of at least one of the inputs 162, the selected subset of images may be discarded at 614. The method moves to 616 to determine if another subset of images remains to be processed. If more subsets of images remain to be processed, the method returns to 604 to select another image subset, else the method terminates on the end block.

It may be appreciated that the processing of the subsets of images 174-1, . . . 174-M is shown as occurring serially only by way of illustration and that the subsets of images 174-1, . . . , 174-M, can also be processed simultaneously in parallel.

Figure 7:
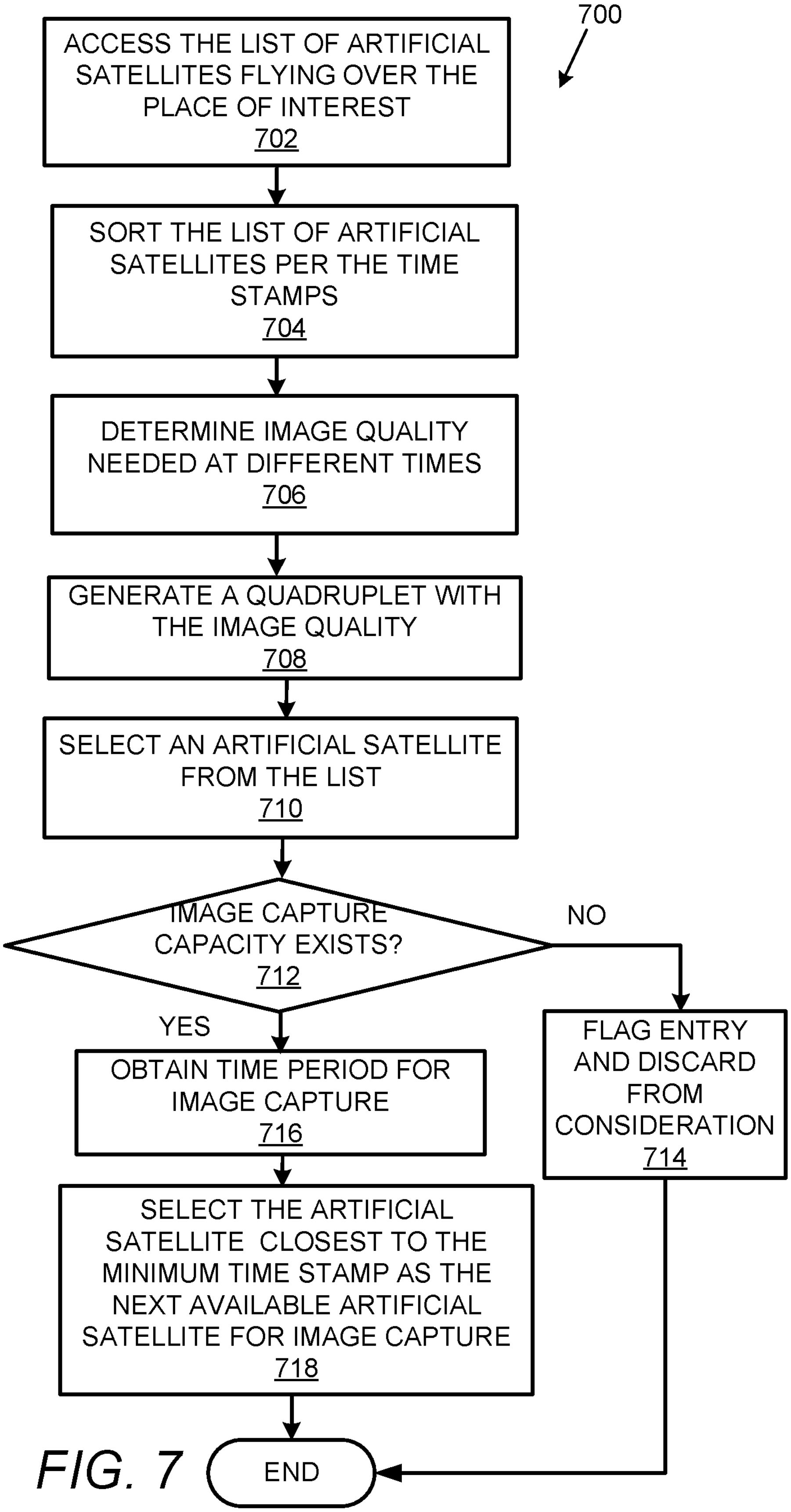
FIG. 7 shows a flowchart of a method of identifying the next available artificial satellite to reach the place of interest in accordance with the examples disclosed herein.

FIG. 7 shows a flowchart 700 of a method of identifying the next available artificial satellite to reach the place of interest in accordance with the examples disclosed herein. The method begins at 702 wherein the list of artificial satellite 164 flying over the place of interest during the period of interest is accessed. In an example, each entry in the list of artificial satellites 164 may include a triplet of the form <location id, satellite id, timestamp>. If a satellite flies over a given location multiple times, then multiple entries with the same satellite id but with different time stamps can be seen for a given location id. At 704, the list of artificial satellites 164 is sorted in ascending order of time stamps so that the artificial satellites reaching the place of interest earlier will be at the top of the sorted list. At 706, the image quality needed to be captured for the place of interest at different times within the period of interest is determined. In an example, a quadruplet can be generated at 708 by adding the image quality needed at a given timestamp to all the triplets associated with that time stamp. At 710, an artificial satellite is selected from the list of artificial satellites 164. It is determined at 712 if the artificial satellite has the capacity for image capture as set out in the quadruplet. If it does not have the capacity, then the artificial satellite is flagged at 714 and discarded from consideration. The time period for the image capture is obtained from the inputs 162 at 716. From the entries which are not flagged, an artificial satellite with a time stamp closest to the minimum time stamp of the image capture period i.e., an artificial satellite calculated to reach the place of interest earliest among the list of artificial satellites 164 is selected as the next available artificial satellite at 718 for image capture. If, for a given location and time gap, all the entries in the list of artificial satellite 164 around that time (respecting the maximum time gap at the leading and lagging direction) are flagged, the set of flagged entries is revisited and the artificial satellite with the best capabilities within the flagged entries may be chosen for acceptable image capture.

Figure 8:
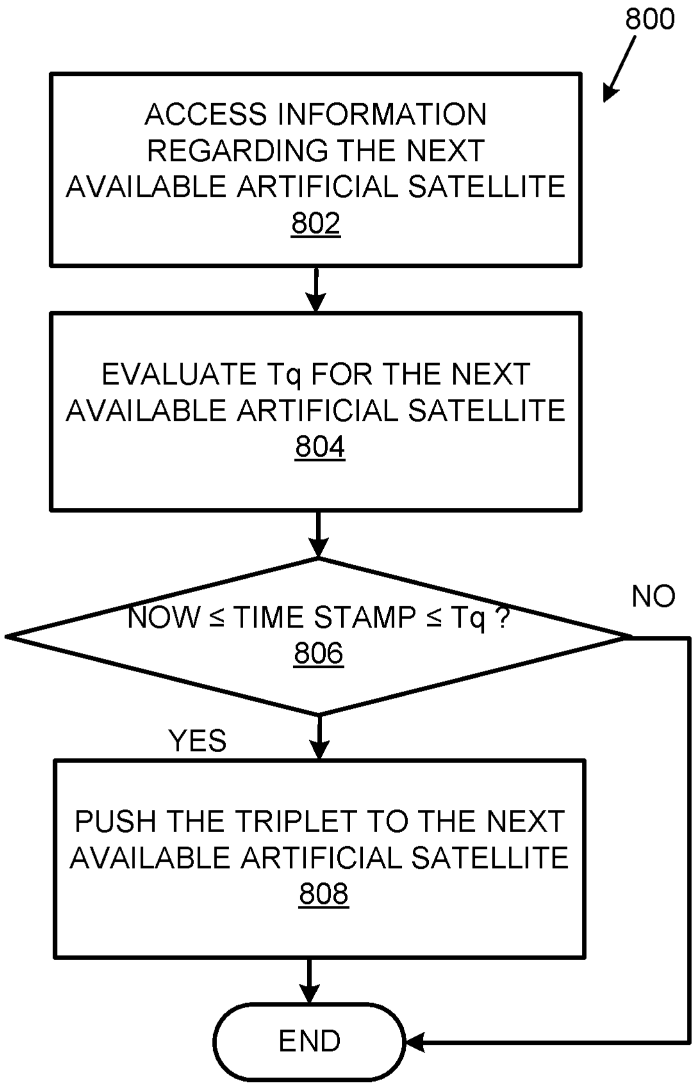
FIG. 8 shows a flowchart of a method of heating the cache of the next available artificial satellite in accordance with the examples disclosed herein.

FIG. 8 shows a flowchart 800 of a method of heating the cache of the next available artificial satellite in accordance with the examples disclosed herein. The information regarding the next available artificial satellite approaching the place of interest and with the capacity for image capture is obtained at 802. For example, the distances traveled by the plurality of artificial satellites 110-1, . . . , 110-N, can be measured in terms of quantum distances which can be predetermined and configured to some practicable value e.g., 50 km. At 804, the time taken by the next available artificial satellite to travel the predetermined quantum distance $t_q$ is evaluated. At 806, it is determined if the time stamp in the triplet including the next available artificial satellite falls between a current time and to the time taken by the next available artificial satellite to travel the quantum distance. If the time stamp in the triplet does not fall between the current time and $t_q$, the method terminates on the end block. If the time stamp in the triplet falls between a current time and $t_q$, then the location, the timestamp, and the quality of the image (i.e., the specifications in the triplet) are pushed or transmitted into the next available artificial satellite at 808.

Figure 9:
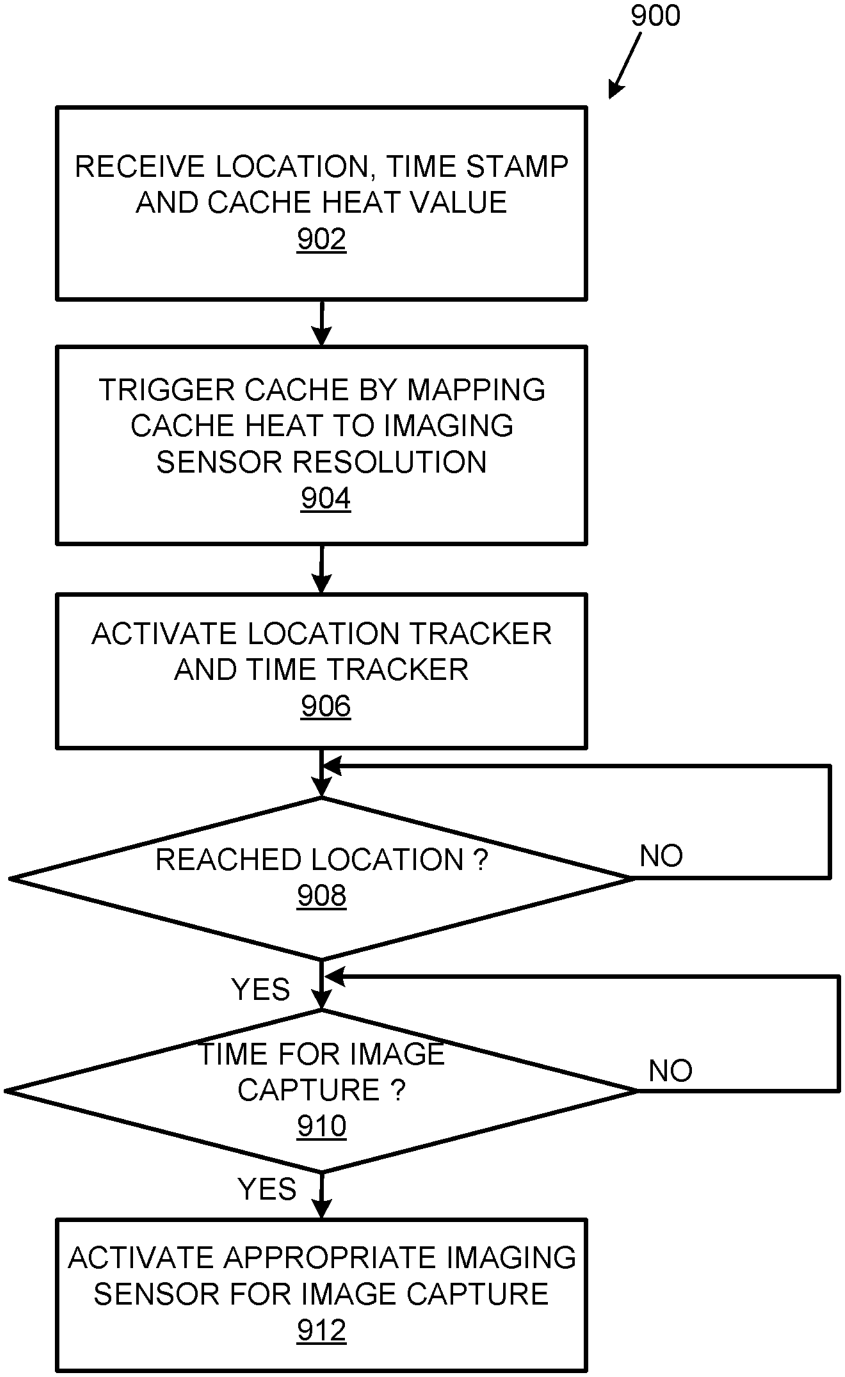
FIG. 9 shows a flowchart that details a method of image capture by the next available artificial satellite in accordance with the examples disclosed herein.

FIG. 9 shows a flowchart 900 that details a method of image capture by the next available artificial satellite in accordance with the examples disclosed herein. At 902, one or more triplets including the location(s), timestamp(s), and the corresponding image quality are received at the next available artificial satellite. The cache of the next available artificial satellite is triggered upon receiving the triplet at 904 with the cache heat value being input to a mapping function that maps the cache heat value into the sensor resolution. The location tracker and the time tracker of the next available artificial satellite are activated at 906. At 908, it is determined if the location is reached. If the location is not yet reached, the method returns to wait until the location is reached. When the location is reached, it is further determined at 910 if it is time for image capture. When it is time for image capture, the image is captured at 912 by the appropriate image sensor/camera with the requisite capacity.

4. System Diagram

Figure 10:
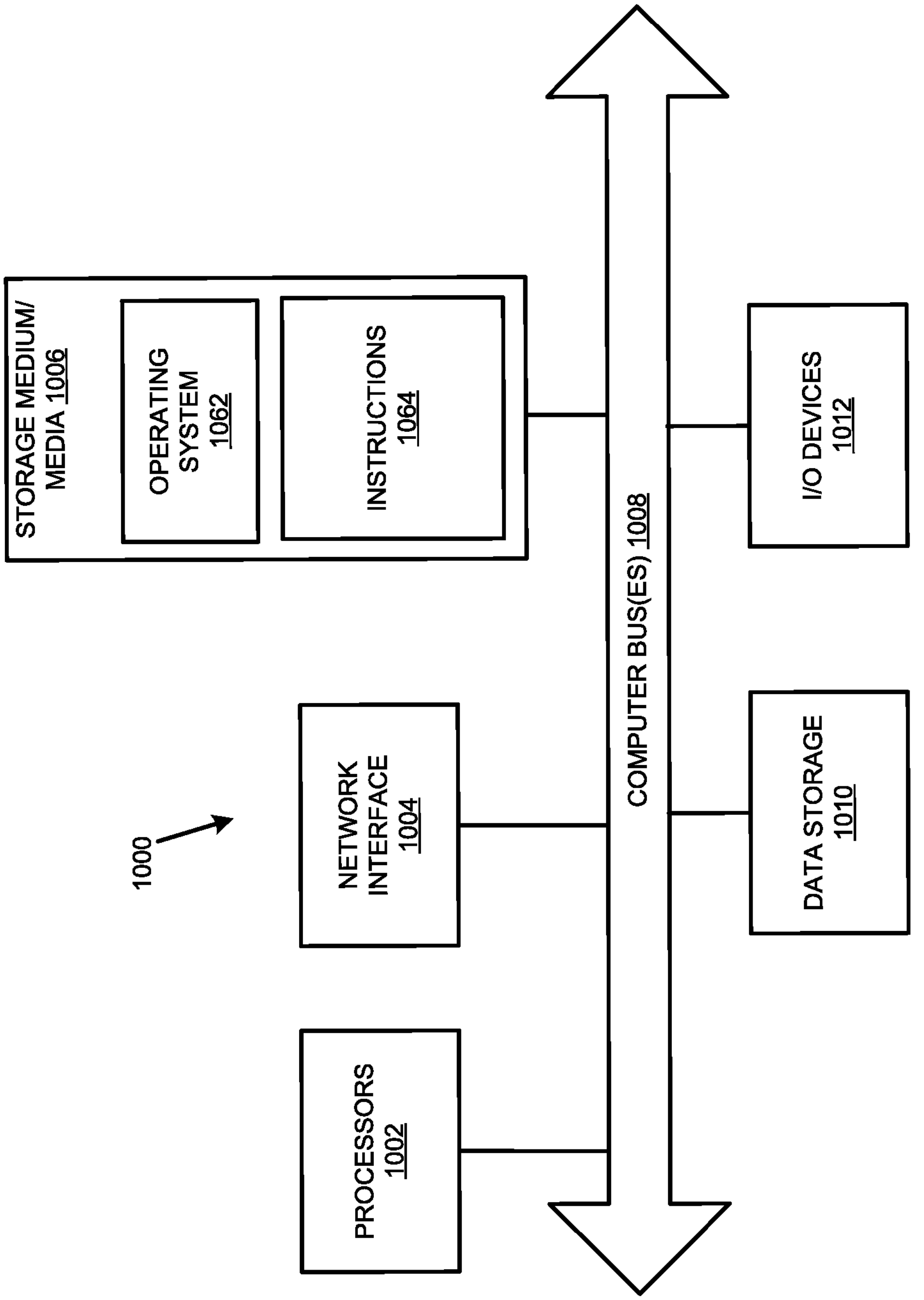
FIG. 10 illustrates a computer system that may be used to implement the satellite orchestrator in accordance with the examples disclosed herein.

FIG. 10 illustrates a computer system 1000 that may be used to implement the satellite orchestrator 150 or may be implemented in one of the plurality of artificial satellites 110-1, . . . , 110-N, in accordance with the examples disclosed herein. More particularly, computing machines such as desktops, laptops, smartphones, tablets, and wearables which may be used to generate or access the data from the satellite orchestrator 150 may have the structure of the computer system 1000. The computer system 1000 may include additional components not shown and some of the process components described may be removed and/or modified. In another example, a computer system 1000 can sit on external-cloud platforms such as Amazon Web Services, AZURE® cloud or internal corporate cloud computing clusters, or organizational computing resources, etc.

The computer system 1000 includes processor(s) 1002, such as a central processing unit, ASIC or another type of processing circuit, input/output (I/O) devices 1012, such as a display, mouse keyboard, etc., a network interface 1004, such as a Local Area Network (LAN), a wireless 802.11x LAN, a 3G, 4G or 5G mobile WAN or a WiMax WAN, and a processor-readable medium 1006. Each of these components may be operatively coupled to a bus 1008. The processor-readable or computer-readable medium 1006 may be any suitable medium that participates in providing instructions to the processor(s) 1002 for execution. For example, the processor-readable medium 1006 may be a non-transitory or non-volatile medium, such as a magnetic disk or solid-state non-volatile memory, or a volatile medium such as RAM. The instructions or modules stored on the processor-readable medium 1006 may include machine-readable instructions 1064 executed by the processor(s) 1002 that cause the processor(s) 1002 to perform the methods and functions of the satellite orchestrator 150.

The satellite orchestrator 150 may be implemented as software or machine-readable instructions stored on a non-transitory processor-readable medium and executed by one or more processors 1002. For example, the processor-readable medium 1006 may store an operating system 1062, such as MAC OS, MS WINDOWS, UNIX, or LINUX, and code/instructions 1064 for the satellite orchestrator 150. The operating system 1062 may be multi-user, multiprocessing, multitasking, multithreading, real-time, and the like. For example, during runtime, the operating system 1062 is running and the code for the Satellite orchestrator 150 is executed by the processor(s) 1002.

The computer system 1000 may include a data storage 1010, which may include non-volatile data storage. The data storage 1010 stores any data used by the satellite orchestrator 150. The data storage 1010 may be used as local data storage of the satellite orchestrator 150 to store the location data, images 172, satellite ids, the lat/long database 210, and other data needed for the operation of the satellite orchestrator 150.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A remote location monitoring system, comprising:

at least one computing device communicatively coupled to one or more artificial satellites orbiting the Earth, wherein the at least one computing device includes:

at least one processor;

a non-transitory, processor-readable medium storing machine-readable instructions that cause the at least one processor to:

identify a place of interest based on images of different locations on the Earth received from the one or more artificial satellites;

identify at least a subset of artificial satellites from the one or more artificial satellites that fly over the place of interest within a threshold period;

select a next available artificial satellite from the subset of satellites, wherein the next available artificial satellite is calculated to reach the place of interest earliest among the subset of artificial satellites, and the next available artificial satellite is capable of capturing meaningful images of the place of interest, wherein the meaningful images meet predetermined image capture specifications;

dynamically transmit to the next available artificial satellite, a cache heating signal specifying the place of interest, time of image capture, and a cache heat value specifying the predetermined image capture specifications, wherein to dynamically heat the cache of the next available artificial satellite, the at least one processor is to:

determine a time period $t_q$ of each artificial satellite of the subset of artificial satellites to traverse through a predetermined quantum distance; and receive the meaningful images of the place of interest from the next available artificial satellite.

2. The remote location monitoring system of claim 1, wherein to identify the place of interest the at least one processor is to:

store the images of different locations in a time series database, wherein the images are tagged with corresponding latitude and longitude data; and generate subsets of the images by grouping the images based on a respective location of the different locations.

3. The remote location monitoring system of claim 2, wherein to identify the place of interest the at least one processor is to:

compare the images in each of the subset of images, wherein the images in the subset of images corresponding to earlier time stamps are compared to images in the subset of images with later time stamps; and identify at least one of the subset of images so that a change in the images corresponding to the earlier time stamps as compared to the images with the later time stamps is greater than a change threshold.

4. The remote location monitoring system of claim 3, wherein to identify the place of interest the at least one processor is to:

receive inputs regarding the different locations, wherein the inputs specify interests, expiry dates associated with the interests, and corresponding image capture specifications for the different locations; and identify a location corresponding to the at least one subset of images as the place of interest based at least on the inputs.

5. The remote location monitoring system of claim 3, wherein the change threshold is based on at least one of absolute pixel-set values triggered as per given conditions or average increasing weight over a series of the corresponding images stored in the time series database.

6. The remote location monitoring system of claim 1, wherein to identify the subset of artificial satellites the at least one processor is to:

generate a list of artificial satellites from the one or more artificial satellites that would fly over the place of interest, wherein the list of artificial satellites includes a triplet for each artificial satellite, each triplet further includes a satellite id identifying the artificial satellite, a location id identifying one of the different locations on the Earth over which the artificial satellite traverses within the threshold period, and one or more time stamps identifying a period of flight of the artificial satellite over the location; and sort the list of artificial satellites based on the time stamps.

7. The remote location monitoring system of claim 6, wherein to identify the subset of artificial satellites, the at least one processor is to:

modify the list of artificial satellites by transforming the triplets into quadruplets by adding to each of the triplets, a corresponding requisite image quality to be achieved by each artificial satellite in the list of artificial satellites.

8. The remote location monitoring system of claim 7, wherein to identify the subset of artificial satellites, the at least one processor is to:

generate the subset of artificial satellites from the list of artificial satellites by:

determining if each artificial satellite in the list of artificial satellites is capable of capturing images of the corresponding requisite image quality, and deleting those artificial satellites from the list of artificial satellites that are not enabled for the corresponding requisite image quality.

9. The remote location monitoring system of claim 1, wherein to dynamically heat the cache of the next available artificial satellite, the at least one processor is to:

determine that the time stamp from a corresponding triplet of the artificial satellite lies between a current time and the time period $t_q$, and upon the determination, transmit location coordinates of the place of interest, a timestamp at which the place of interest should be imaged, and a requisite quality of image capture.

10. The remote location monitoring system of claim 9, wherein the requisite quality of image capture is mapped to a heat value stored in the cache of the next available artificial satellite, and a higher heat value translates to higher image quality.

11. The remote location monitoring system of claim 1, wherein an interest in the place of interest is valid for a threshold period and the at least one processor is to:

terminate monitoring of the place of interest at an end of the threshold period; and delete the subset of images corresponding to the place of interest at the end of the threshold period.

12. A remote location monitoring system, comprising:

one or more artificial satellites orbiting the Earth, wherein each of the one or more artificial satellites includes an onboard cache storing a configurable mapping file that maps cache heat values to sensor resolutions; and at least one computing device communicatively coupled to the one or more artificial satellites, wherein the at least one computing device includes:

at least one processor;

a non-transitory, processor-readable medium storing machine-readable instructions that cause the at least one processor to:

identify a place of interest based on images of different locations on the Earth received from the one or more artificial satellites;

identify at least a subset of artificial satellites from the one or more artificial satellites that fly over the place of interest within a threshold period;

select a next available artificial satellite from the subset of artificial satellites, wherein the next available artificial satellite is calculated to reach the place of interest earliest among the subset of satellites, and the next available artificial satellite is capable of capturing meaningful images of the place of interest;

dynamically transmit to the next available artificial satellite, a cache heating signal specifying the place of interest, a time of image capture, and a cache heat value indicative of the predetermined image capture specifications, wherein to dynamically heat the cache of the next available artificial satellite, the at least one processor is to:

determine a time period $t_q$ of each artificial satellite of the subset of artificial satellites to traverse through a predetermined quantum distance; and receive the meaningful images of the place of interest from the next available artificial satellite.

13. The remote location monitoring system of claim 12, wherein to identify the place of interest the at least one processor is to:

store the images of different locations in a time series database, wherein the images are tagged with corresponding latitude and longitude data;

generate subsets of the images by grouping the images based on the respective location of the different locations;

compare the images in each of the subset of images, wherein the images in the subset of images corresponding to earlier time stamps are compared to images in the subset of images with later time stamps;

identify at least one of the subset of images so that a change in the images corresponding to the earlier time stamps as compared to the images with the later time stamps is greater than a change threshold;

receive inputs regarding the different locations, wherein the inputs include interests, threshold periods associated with the interests, and corresponding image capture specifications for the different locations; and identify a location corresponding to the at least one subset of images as the place of interest based at least on the inputs.

14. The remote location monitoring system of claim 12, wherein to select the next available artificial satellite the at least one processor is to:

generate a list of artificial satellites that would fly over the place of interest, wherein the list of artificial satellites includes a triplet for each artificial satellite, each triplet further includes a satellite id identifying the artificial satellite, a location id identifying a location on the Earth over which the artificial satellite flies over within the threshold period and one or more time stamps identifying a period of flight of the artificial satellite over the location; and sort the list of artificial satellites based on the time stamps.

15. The remote location monitoring system of claim 14, wherein to select the next available artificial satellite the at least one processor is to:

modify the list of artificial satellites by transforming the triplets into quadruplets by adding to each of the triplets, a corresponding requisite image quality to be achieved by each satellite in the list of artificial satellites.

16. The remote location monitoring system of claim 15, wherein to select the next available artificial satellite the at least one processor is to:

generate the subset of artificial satellites from the list of artificial satellites by:

determining if each artificial satellite in the list of artificial satellites is capable of capturing images of the corresponding requisite image quality, and deleting those artificial satellites from the list of artificial satellites that are not enabled for the corresponding requisite image quality.

17. An artificial satellite comprising:

at least one processor;

a non-transitory, processor-readable medium storing machine-readable instructions that cause the at least one processor to:

receive at least a place of interest, a timestamp for image capture, and a cache heat value when orbiting the Earth;

map the cache heat to a resolution of at least one imaging sensor of one or more onboard imaging sensors;

activate location tracker and time tracker;

identify that the place of interest has been reached via the location tracker;

determine that a time for the image capture is reached based on the time tracker reaching the time stamp;

activate the at least one imaging sensor based on the mapping; and capture at least one image of the place of interest by activating the imaging sensor at a time specified in the time stamp;

store within the cache, a configurable mapping file that maps the cache heat value to a resolution of at least one imaging sensor of one or more onboard imaging sensors, wherein the configurable mapping file is set based at least on inputs specifying the place of interest, the time stamp for image capture, and the cache heat value.

18. The artificial satellite of claim 17, wherein the non-transitory, processor-readable medium comprises further instructions that cause the at least one processor to:

capture the at least one image at a resolution specified by the cache heat value; and transmit the at least one image to a satellite orchestrator.

* * * * *